US011927487B2

(12) United States Patent
Schnaare

(10) Patent No.: US 11,927,487 B2
(45) Date of Patent: Mar. 12, 2024

(54) WIRELESS INDUSTRIAL PROCESS MONITOR

(71) Applicant: Rosemount Inc., Shakopee, MN (US)

(72) Inventor: Theodore Henry Schnaare, Carver, MN (US)

(73) Assignee: ROSEMOUNT INC., Shakopee, MN (US)

( * ) Notice: Subject to any disclaimer, the term of this patent is extended or adjusted under 35 U.S.C. 154(b) by 0 days.

(21) Appl. No.: 17/156,907

(22) Filed: Jan. 25, 2021

(65) Prior Publication Data

US 2021/0148763 A1 May 20, 2021

Related U.S. Application Data

(63) Continuation of application No. 14/499,719, filed on Sep. 29, 2014, now Pat. No. 10,914,635.

(51) Int. Cl.
| | | |
|---|---|---|
| *G01H 17/00* | (2006.01) | |
| *G01J 5/10* | (2006.01) | |
| *G01M 99/00* | (2011.01) | |
| *H04Q 9/00* | (2006.01) | |
| *G01J 5/00* | (2022.01) | |

(52) U.S. Cl.
CPC ............. *G01J 5/10* (2013.01); *G01H 17/00* (2013.01); *G01M 99/00* (2013.01); *H04Q 9/00* (2013.01); *G01J 2005/0077* (2013.01); *H04Q 2209/823* (2013.01)

(58) Field of Classification Search
CPC .... G01J 5/10; G01J 2005/0077; G01H 17/00; G01M 99/00; H04Q 9/00; H04Q 2209/823; G06F 1/32
See application file for complete search history.

(56) References Cited

U.S. PATENT DOCUMENTS

| | | |
|---|---|---|
| 3,857,277 A | 12/1974 | Moore |
| 4,306,457 A | 12/1981 | Fukui |

(Continued)

FOREIGN PATENT DOCUMENTS

| | | |
|---|---|---|
| AU | 2002256070 | 5/2006 |
| CN | 1214958 | 4/1999 |

(Continued)

OTHER PUBLICATIONS

DF-TV7-T, Multi-Spectrum 3IR Flame Detector, Groveley Detection Ltd., 2 pgs. no date.

(Continued)

*Primary Examiner* — Eyob Hagos
(74) *Attorney, Agent, or Firm* — Westman, Champlin & Koehler, P.A.

(57) ABSTRACT

An industrial process monitor for monitoring an industrial process includes a controller configured to control operation of the industrial process monitor. An ambient environment sensor is configured to sense an ambient environment of the industrial process proximate the device and responsively provide a sensor output signal. Output circuitry is configured to provide an output based upon the sensor output signal. The controller causes the ambient environment sensor to enter a high power mode upon detection of an anomaly and/or probable anomaly in the sensor output signal.

22 Claims, 6 Drawing Sheets

(56) References Cited

U.S. PATENT DOCUMENTS

| | | |
|---|---|---|
| 4,736,250 A | 4/1988 | Blazo |
| 4,900,161 A | 2/1990 | Wolf et al. |
| 4,947,247 A | 8/1990 | Farver |
| 5,056,046 A | 10/1991 | Mutchler |
| 5,109,277 A | 4/1992 | James |
| 5,144,430 A | 9/1992 | Boelart |
| 5,292,195 A | 3/1994 | Crisman, Jr. |
| 5,638,174 A | 6/1997 | Henderson |
| 5,654,977 A | 8/1997 | Morris |
| 6,000,844 A | 12/1999 | Cramer et al. |
| 6,059,453 A | 5/2000 | Kempf et al. |
| 6,259,810 B1 | 7/2001 | Gill et al. |
| 6,346,704 B2 | 2/2002 | Kenway |
| 6,461,573 B1 * | 10/2002 | Yamamoto ............ B01J 8/1809 |
| | | 422/139 |
| 6,518,744 B1 | 2/2003 | Tallman |
| 6,573,331 B1 | 6/2003 | Camberlin |
| 6,631,287 B2 | 10/2003 | Newman et al. |
| 7,208,735 B2 | 4/2007 | Sierra et al. |
| 7,248,297 B2 | 7/2007 | Catrysse et al. |
| 7,372,485 B1 | 5/2008 | Bodnar et al. |
| 7,407,323 B2 | 8/2008 | Hutcherson |
| 7,409,867 B2 | 8/2008 | Toy et al. |
| 7,460,024 B1 * | 12/2008 | Ma .................... G08B 21/0286 |
| | | 340/693.3 |
| 7,466,240 B2 | 12/2008 | Evans et al. |
| 7,472,215 B1 * | 12/2008 | Mok .................... G06F 1/3203 |
| | | 361/679.48 |
| 7,636,114 B2 | 12/2009 | Aoyama |
| 7,680,460 B2 | 3/2010 | Nelson et al. |
| 7,768,425 B2 | 8/2010 | Evans et al. |
| 7,809,379 B2 | 10/2010 | Hedtke et al. |
| 7,852,271 B2 | 12/2010 | Grunig et al. |
| 7,852,383 B2 | 12/2010 | Harada |
| 8,098,302 B2 | 1/2012 | Fakuda et al. |
| 8,108,790 B2 | 1/2012 | Morrison, Jr. et al. |
| 8,121,078 B2 | 2/2012 | Siann et al. |
| 8,191,005 B2 | 5/2012 | Baier et al. |
| 8,208,752 B2 | 6/2012 | Ishii |
| 8,310,541 B2 | 11/2012 | Moore |
| 8,410,946 B2 | 4/2013 | Ansari et al. |
| 8,538,560 B2 | 9/2013 | Brown et al. |
| 8,706,448 B2 | 4/2014 | Orth |
| 8,898,036 B2 | 11/2014 | Sittler et al. |
| 9,019,108 B2 | 4/2015 | Chillar et al. |
| 9,049,239 B2 | 6/2015 | Kenney et al. |
| 9,201,414 B2 | 12/2015 | Kantzes et al. |
| 9,201,419 B2 | 12/2015 | Timsjo et al. |
| 9,247,374 B2 | 1/2016 | Tomimatsu et al. |
| 9,537,699 B2 | 1/2017 | Kenney et al. |
| 9,696,429 B2 | 7/2017 | Turon et al. |
| 9,711,038 B1 * | 7/2017 | Pennebaker, III ...... G01F 23/18 |
| 9,727,115 B1 * | 8/2017 | Brown .................. G05F 1/66 |
| 10,169,860 B2 | 1/2019 | Spahn et al. |
| 2001/0042834 A1 | 11/2001 | Kenway |
| 2003/0027949 A1 | 2/2003 | Yamamoto et al. |
| 2004/0041538 A1 | 3/2004 | Sklovsky |
| 2004/0156549 A1 | 8/2004 | Persiantsev |
| 2004/0218099 A1 | 11/2004 | Washington |
| 2004/0245467 A1 | 12/2004 | Lannestedt |
| 2005/0008072 A1 | 1/2005 | Angerer |
| 2005/0012817 A1 | 1/2005 | Hampapur et al. |
| 2005/0025368 A1 | 2/2005 | Glukhovsky |
| 2005/0111696 A1 | 5/2005 | Baer |
| 2005/0164684 A1 | 7/2005 | Chen et al. |
| 2005/0220331 A1 | 10/2005 | Kychakoff et al. |
| 2006/0026971 A1 | 2/2006 | Sharpe |
| 2006/0092153 A1 | 5/2006 | Chu et al. |
| 2006/0148410 A1 | 7/2006 | Nelson |
| 2006/0278827 A1 | 12/2006 | Sierra et al. |
| 2007/0019077 A1 | 1/2007 | Park |
| 2007/0052804 A1 | 3/2007 | Money et al. |
| 2007/0073439 A1 | 3/2007 | Habibi et al. |
| 2007/0125949 A1 | 6/2007 | Murata et al. |
| 2008/0155064 A1 * | 6/2008 | Kosuge ................ G08B 21/20 |
| | | 709/219 |
| 2008/0165195 A1 | 7/2008 | Rosenberg |
| 2008/0210872 A1 | 9/2008 | Grimberg |
| 2008/0255637 A1 | 10/2008 | Oishi |
| 2008/0278145 A1 | 11/2008 | Wenger |
| 2009/0078047 A1 | 3/2009 | Dam |
| 2009/0117949 A1 * | 5/2009 | Allen, Jr. ................ H04W 8/22 |
| | | 455/572 |
| 2009/0249405 A1 | 10/2009 | Karaoguz et al. |
| 2009/0285259 A1 | 11/2009 | Allen et al. |
| 2010/0013918 A1 | 1/2010 | Ta ' Eed |
| 2010/0220180 A1 | 9/2010 | Lee et al. |
| 2011/0154900 A1 * | 6/2011 | Watanabe .......... G01N 29/4427 |
| | | 73/579 |
| 2011/0230942 A1 | 9/2011 | Herman et al. |
| 2011/0317066 A1 | 12/2011 | Capman et al. |
| 2012/0025081 A1 | 2/2012 | Rapp et al. |
| 2012/0041582 A1 | 2/2012 | Wallace |
| 2012/0109342 A1 | 5/2012 | Braun et al. |
| 2012/0109582 A1 * | 5/2012 | Moriya .................. C03C 4/0035 |
| | | 702/183 |
| 2012/0157009 A1 | 6/2012 | Hollander |
| 2012/0161958 A1 * | 6/2012 | Turon ...................... G01S 19/34 |
| | | 340/539.3 |
| 2013/0009472 A1 * | 1/2013 | Orth ...................... G05B 19/042 |
| | | 307/43 |
| 2013/0085688 A1 * | 4/2013 | Miller ...................... G01F 1/66 |
| | | 702/48 |
| 2013/0099922 A1 * | 4/2013 | Lohbihler ............ G08B 13/184 |
| | | 340/539.17 |
| 2013/0120561 A1 | 5/2013 | Heintze |
| 2013/0163812 A1 | 6/2013 | Mukasa |
| 2013/0176418 A1 | 7/2013 | Pandey et al. |
| 2013/0222608 A1 | 8/2013 | Baer |
| 2013/0250125 A1 | 9/2013 | Garrow et al. |
| 2013/0294478 A1 | 11/2013 | Puroll et al. |
| 2014/0003465 A1 | 1/2014 | Elke |
| 2014/0128118 A1 * | 5/2014 | Tomimatsu ........ H04W 52/0251 |
| | | 455/73 |
| 2014/0183386 A1 * | 7/2014 | Ravid ...................... G06F 17/00 |
| | | 702/45 |
| 2014/0303793 A1 * | 10/2014 | Anderson ............ F16K 37/0083 |
| | | 700/282 |
| 2014/0375820 A1 | 12/2014 | Priyantha et al. |
| 2015/0022368 A1 * | 1/2015 | Smith .................... G08B 25/08 |
| | | 340/693.3 |
| 2015/0116482 A1 | 4/2015 | Bronmark et al. |
| 2015/0130927 A1 | 5/2015 | Luxen et al. |
| 2015/0330866 A1 * | 11/2015 | Yang ...................... H04N 5/217 |
| | | 73/112.02 |
| 2015/0362090 A1 * | 12/2015 | Anderson ............ F16K 37/0041 |
| | | 137/551 |
| 2016/0091370 A1 | 3/2016 | Schnaare |

FOREIGN PATENT DOCUMENTS

| | | |
|---|---|---|
| CN | 2694128 | 4/2005 |
| CN | 1882078 | 12/2006 |
| CN | 101014091 | 8/2007 |
| CN | 101019419 | 8/2007 |
| CN | 101046375 | 10/2007 |
| CN | 101277383 | 10/2008 |
| CN | 101460592 | 6/2009 |
| CN | 201322868 Y | 10/2009 |
| CN | 101600046 | 12/2009 |
| CN | 101647216 | 2/2010 |
| CN | 101681161 | 3/2010 |
| CN | 101685295 | 3/2010 |
| CN | 1012483618 | 5/2012 |
| CN | 102830669 | 12/2012 |
| CN | 102999022 | 3/2013 |
| CN | 103380446 | 10/2013 |
| CN | 103947170 A | 7/2014 |
| CN | 204350309 U | 5/2015 |
| EP | 2 130 187 | 4/2017 |
| JP | 52-140779 | 11/1977 |
| JP | 53-86111 | 7/1978 |

(56) References Cited

FOREIGN PATENT DOCUMENTS

| | | |
|---|---|---|
| JP | S58-090882 | 5/1983 |
| JP | 61-136340 | 6/1986 |
| JP | 62-179647 | 8/1987 |
| JP | 64-73880 | 3/1989 |
| JP | H07-325900 | 12/1995 |
| JP | H09-265316 | 10/1997 |
| JP | 10-47312 | 2/1998 |
| JP | H10-294933 | 11/1998 |
| JP | 11-23350 | 1/1999 |
| JP | H11-75176 | 3/1999 |
| JP | 11-189603 | 7/1999 |
| JP | 11-218442 | 8/1999 |
| JP | 2000-310577 | 11/2000 |
| JP | 2001-84031 | 3/2001 |
| JP | 2001-221666 | 8/2001 |
| JP | 2001-238198 | 8/2001 |
| JP | 2001-256475 | 9/2001 |
| JP | 2002-300569 | 10/2002 |
| JP | 2004-288092 | 10/2004 |
| JP | 2005-134357 | 5/2005 |
| JP | 2006-031418 | 2/2006 |
| JP | 2007-108836 | 4/2007 |
| JP | 2008-527493 | 7/2008 |
| JP | 2008-257513 | 10/2008 |
| JP | 2009-210042 | 9/2009 |
| JP | 2012-175631 | 9/2010 |
| JP | 2010-536092 | 11/2010 |
| JP | 2010-283444 | 12/2010 |
| JP | 2011-185926 | 9/2011 |
| JP | 2011-209033 | 10/2011 |
| JP | 2012-037519 | 2/2012 |
| JP | 2012-58093 | 3/2012 |
| JP | 2013-009079 | 1/2013 |
| JP | 2013-533570 | 8/2013 |
| JP | 2014-523033 | 9/2014 |
| RU | 2 372 667 | 11/2009 |
| RU | 2419926 | 5/2011 |
| TW | I220364 | 8/2004 |
| WO | WO 2004/011935 | 2/2004 |
| WO | 2006081154 A3 | 9/2007 |
| WO | WO 2007/139123 | 12/2007 |
| WO | WO 2008/136752 | 11/2008 |
| WO | WO 2009/074708 | 6/2009 |
| WO | WO 2011/004020 | 1/2011 |
| WO | WO 2011/137264 | 11/2011 |
| WO | WO 2013/006307 | 1/2013 |
| WO | WO 2013/009715 | 1/2013 |
| WO | WO-2013006307 A1 * 1/2013 ........... G05B 19/042 |  |

OTHER PUBLICATIONS

DF-TV7-V, Combined UV/2IR Flame Detector, Groveley Detection Ltd., 2 pgs. no date.
FDS301, Visual Flame Detector FDS301, Groveley Detection Ltd., 2 pgs. no date.
Hardesty, Larry. (MIT News Office). MIT News "Researchers amplify variations in video, making the invisible visible," dated Jun. 22, 2012, 3 pgs. Found at http://web.mit.edu/newsoffice/2012/amplifying-invisible-video-0622.html.
First Correct Notification for Chinese Patent Application No. 201420426405.7, dated Oct. 31, 2014, 4 pages.
Notification of Transmittal of the International Search Report and the Written Opinion of the International Searching Authority, PCT/US2014/051625, dated Oct. 23, 2014.
Office Action from Chinese Patent Application No. 201320868039.6, dated May 19, 2014.
Notification of Transmittal of the International Search Report and the Written Opinion of the International Searching Authority, PCT/US2014/051432, dated Jan. 12, 2015.
Invitation to Pay Additional Fees, PCT/US2014/051628, dated Nov. 25, 2014.
Notification of Transmittal of the International Search Report and the Written Opinion of the International Searching Authority, PCT/US2014/069968, dated Mar. 19, 2015.
Notification of Transmittal of the International Search Report and the Written Opinion of the International Searching Authority, PCT/US2014/051628, dated Apr. 13, 2015.
Office Action from U.S. Appl. No. 14/224,814, dated Jul. 8, 2015.
Office Action from U.S. Appl. No. 14/224,858, dated Jun. 12, 2015.
Notification of Transmittal of the International Search Report and the Written Opinion of the International Searching Authority, PCT/US2015/011958, dated May 18, 2015.
"Integrated Wireless Gas Detection Solution", www.gassecure.com, Jun. 2014, 2 pgs.
"GS01 Wireless Gas Detector", www.gassecure.com, Jun. 2014, 2 pgs.
Office Action from U.S. Appl. No. 14/224,858, dated Oct. 2, 2015.
Notification of Transmittal of the International Search Report and the Written Opinion of the International Searching Authority, PCT/US2015/040310, dated Nov. 11, 2015.
Final Office Action from U.S. Appl. No. 14/224,814, dated Feb. 1, 2016.
Office Action from U.S. Appl. No. 14/224,858, dated Feb. 5, 2016.
Office Action from U.S. Appl. No. 14/224,814, dated Jun. 15, 2016.
Office Action from U.S. Appl. No. 14/037,989, dated Jun. 3, 2016.
Office Action from European Application Serial No. 14761468.9, dated May 4, 2016.
Office Action from U.S. Appl. No. 14/038,090, dated Jun. 28, 2016.
Office Action from European Application Serial No. 14761467.1, dated May 4, 2016.
Office Action from Russian Application Serial No. 2016116020, dated May 31, 2016.
Office Action from European Application Serial No. 14783924.5, dated Jun. 3, 2016.
Examination Report from Australian Application Serial No. 2014328576, dated Jul. 21, 2016.
Office Action from Chinese Application Serial No. 201310737591.6, dated Oct. 17, 2016.
Examination Report from Australian Application Serial No. 2014328666, dated Oct. 11, 2016.
Office Action from Chinese Application Serial No. 201410024656.7, dated Oct. 9, 2016.
Office Action from Canadian Application Serial No. 2,923,153, dated Jan. 16, 2017.
Office Action from Chinese Patent Application No. 201410061865.9 dated Oct. 28, 2016.
Communication from European Patent Application No. 15706956.8, dated Nov. 7, 2016.
Office Action from Canadian Application Serial No. 2,923, 156, dated Feb. 2, 2017.
Office Action from U.S. Appl. No. 14/037,989, dated Feb. 10, 2017.
Office Action from U.S. Appl. No. 14/499,719, dated Mar. 23, 2017.
Office Action (including Search Report) from Russian Application Serial No. 2016116020, dated Feb. 10, 2017.
Office Action from Australian Patent Application No. 2014328576, dated Feb. 24, 2017.
Office Action from Canadian Patent Application No. 2,923,159, dated Mar. 7, 2017.
Office Action from Japanese Patent Application No. 2016-516988, dated Mar. 24, 2017.
Office Action from Japanese Patent Application No. 2016-516983, dated Mar. 8, 2017.
Office Action from Canadian Patent Application No. 2,923,159 dated May 19, 2017.
Office Action from Chinese Patent Application No. 201410366848.6, dated Feb. 24, 2017.
Communication from European Patent Application No. 15744804.4, dated May 9, 2017.
Office Action from Chinese Patent Application No. 201310737591.6, dated Jun. 1, 2017.
Examination Report No. 2 from Australian Patent Application No. 2014328666, dated Jun. 16, 2017.
"ADNS-5090 Low Power Optical Mouse Sensor Data Sheet", Avago Technologies, dated Apr. 25, 2012.

(56) References Cited

OTHER PUBLICATIONS

Office Action from Chinese Patent Application No. 201410024656.7, dated Jun. 8, 2017.
Office Action from Japanese Patent Application No. 2016-517425, dated Jun. 6, 2017.
Office Action from Chinese Patent Application No. 201410061865.9, dated Jun. 9, 2017.
Third Examination Report from Australian Patent Application No. 2014328576, dated Jun. 29, 2017.
Office Action from U.S. Appl. No. 14/038,090, dated Jul. 28, 2017.
Office Action from Canadian Patent Application No. 2,943,542, dated Jul. 31, 2017.
Office Action from U.S. Appl. No. 14/037,989, dated Aug. 18, 2017.
Office Action from Russian Patent Application No. 2016116017, dated Jun. 8, 2017.
"Heat Transfer Performance for Batch Oscillatory Flow Mixing", by Stephens et al., Elsevier 2002.
Office Action from U.S. Appl. No. 14/038,185, dated Oct. 24, 2016.
Office Action from U.S. Appl. No. 14/038,185, dated May 17, 2017.
Office Action from Russian Patent Application No. 2016116039, dated Jul. 13, 2017.
Third Examination Report from Australian Patent Application No. 2014328666, dated Oct. 10, 2017.
Office Action from Japanese Patent Application No. 2016-558794, dated Oct. 24, 2017.
Examination Report from Australian Patent Application No. 2015324515 dated Sep. 4, 2017.
Office Action from Chinese Patent Application No. 201410366848.6, dated Nov. 6, 2017.
Office Action from U.S. Appl. No. 14/499,719, dated Oct. 6, 2017.
Final Rejection from Japanese Patent Application No. 2016-516988, dated Nov. 8, 2017, 11 pages.
Office Action from Canadian Patent Application No. 2,923,156, dated Nov. 30, 2017.
Office Action from Canadian Patent Application No. 2,957,246, dated Dec. 8, 2017.
Final Office Action from U.S. Appl. No. 14/038,090, dated Jan. 24, 2018, 33 pages.
Office Action from U.S. Appl. No. 14/038,185, dated Nov. 2, 2017.
Office Action from Chinese Patent Application No. 201310737591.6, dated Nov. 29, 2017.
Office Action from Japanese Patent Application No. 2016-516983, dated Dec. 6, 2017.
Office Action from Canadian Patent Application No. 2,923,153, dated Dec. 13, 2017.
Office Action from Chinese Patent Application No. 201410831781.9, dated Nov. 28, 2017, 13 pages.
Office Action from Chinese Patent Application No. 201410024656.7 dated Dec. 28, 2017.
Office Action from Japanese Patent Application No. 2016-517425, dated Jan. 9, 2018.
Office Action from Japanese Patent Application No. 2017-516333, dated Mar. 20, 2018.
Office Action from U.S. Appl. No. 14/037,989, dated Dec. 29, 2017.
Office Action from European Patent Application No. 14783924.5, dated Mar. 16, 2018.
Office Action from Russian Patent Application No. 2017114674, dated May 31, 2018.
Office Action from Canadian Patent Application No. 2,957,246, dated Jul. 30, 2018.
Office Action from Japanese Patent Application No. 2017-516333, dated Jul. 31, 2018.
Office Action from Chinese Patent Application No. 201310737591.6, dated May 24, 2018.
Office Action from U.S. Appl. No. 14/037,989, dated Aug. 16, 2018.
Office Action from U.S. Appl. No. 14/038,090, dated Aug. 9, 2018.
Office Action from Canadian Patent Application No. 2,923,156, dated Jun. 19, 2018.
Office Action from U.S. Appl. No. 14/038,185, dated Oct. 19, 2018.
Office Action from Chinese Patent Application No. 201410024656.7, dated Sep. 20, 2018.
Office Action from Chinese Patent Application No. 201410831781.9, dated Aug. 9, 2018.
Office Action from U.S. Appl. No. 14/499,719, dated Jul. 9, 2018.
Office Action from Canadian Patent Application No. 2,923,153, dated Aug. 24, 2018.
Office Action from U.S. Appl. No. 14/037,989, dated Nov. 29, 2018.
Office Action from Russian Patent Application No. 2017114674, dated Oct. 26, 2018.
Office Action from U.S. Appl. No. 14/038,185, dated Apr. 5, 2018.
Trial Decision from Japanese Patent Application No. 2016-516988 (Appeal No. 2017-18657), dated Oct. 31, 2018.
Examination Report from Indian Patent Application No. 201627005256, dated Dec. 22, 2018.
Final Office Action from U.S. Appl. No. 14/038,090, dated Feb. 7, 2019.
Communication from European Patent Application No. 15744804.4, dated Jan. 31, 2019.
Office Action from Chinese Patent Application No. 201410831781.9, dated Mar. 4, 2019.
Office Action from Japanese Patent Application No. 2017-516333, dated Dec. 18, 2018.
Office Action from U.S. Appl. No. 14/038,185, dated May 16, 2019.
Office Action from Canadian Patent Application No. 2,923,156, dated Mar. 21, 2019.
Office Action from Canadian Patent Application No. 2,923,153 dated Mar. 21, 2019.
Examination Report from Indian Patent Application No. 201627004690, dated Mar. 27, 2019.
Office Action from U.S. Appl. No. 14/037,989, dated Jun. 6, 2019.
Office Action from U.S. Appl. No. 14/038,090, dated Jun. 28, 2019.
Office Action from Japanese Patent Application No. 2018-004260, dated May 28, 2019.
Communication from European Patent Application No. 14761467.1, dated May 29, 2019.
Office Action from Chinese Patent Application No. 201410024656.7, dated Jun. 20, 2019.
Office Action from U.S. Appl. No. 14/499,719, dated Aug. 21, 2019.
Office Action from U.S. Appl. No. 14/037,989, dated Sep. 17, 2019.
Office Action from Australian Patent Application No. 2018222951, dated Jul. 12, 2019.
Office Action from U.S. Appl. No. 14/038,185, dated Oct. 4, 2019.
Office Action from Chinese Patent Application No. 201410831781.9, dated Sep. 18, 2019.
Appeal Decision from Japanese Patent Application No. 2016-517425, dated Oct. 29, 2019.
Examination Report from Indian Patent Application No. 201627004614, dated Dec. 12, 2019.
Communication from European Patent Application No. 14761468.9, dated Nov. 7, 2019.
Communication from European Patent Application No. 14761467.1, dated Dec. 5, 2019.
Communication from European Patent Application No. 14783924.5, dated Jan. 2, 2020.
Office Action from U.S. Appl. No. 14/499,719, dated Mar. 2, 2020.
Examination Report No. 2 from Australian Patent Application No. 2018222951, dated Mar. 4, 2020.
Office Action from U.S. Appl. No. 14/037,989, dated Mar. 10, 2020.
Office Action from U.S. Appl. No. 14/038,185, dated Apr. 16, 2020.
Examination Report from Indian Patent Application No. 201727002213, dated Apr. 30, 2020.
Office Action from Chinese Patent Application No. 201410831781.9, dated Jun. 22, 2020.
Communication from European Patent Application No. 14761468.9, dated Jul. 29, 2020.
Office Action from U.S. Appl. No. 14/037,989, dated Oct. 16, 2020.
Notice of Allowance from U.S. Appl. No. 14/499,719, dated Oct. 6, 2020.
Advisory Action from U.S. Appl. No. 14/499,719, dated Dec. 15, 2017.
Advisory Action from U.S. Appl. No. 14/499,719, dated May 1, 2019.

(56) References Cited

OTHER PUBLICATIONS

Advisory Action from U.S. Appl. No. 14/499,719, dated May 29, 2020.
Final Office Action from U.S. Appl. No. 14/499,719, dated Feb. 21, 2019.
Hearing Notice from Indian Patent Application No. 201727002213, dated Nov. 28, 2022.

* cited by examiner

Anomaly

Anomaly

WIRELESS INDUSTRIAL PROCESS MONITOR

CROSS-REFERENCE TO RELATED APPLICATION

The present application is a Continuation application and claims the benefit of U.S. patent application Ser. No. 14/499,719, filed Sep. 29, 2014, the content of this application is hereby incorporated by reference in its entirety.

BACKGROUND

The present invention relates to industrial process control or monitoring systems. More specifically, the present invention relates to wireless process field devices used in such systems.

In industrial settings, systems are used to monitor and control inventories and operation of industrial and chemical processes, and the like. Typically, the system that performs these functions uses field devices distributed at key locations in the industrial process coupled to control circuitry in the control room by a process control loop. The term "field device" refers to any device that performs a function in a distributed control or process monitoring system, including all devices used in the measurement, control and monitoring of industrial processes.

Typically, each field device also includes communication circuitry that is used for communicating with a process controller, other field devices, or other circuitry, over the process control loop. In some installations, the process control loop is also used to deliver a regulated current and/or voltage to the field device for powering the field device. The process control loop also carries data, either in an analog or digital format.

In sonic installations, wireless technologies have begun to be used to communicate with field devices. Wireless operation simplifies field device wiring and setup. Wireless installations are currently used in which the field device includes an internal power source. However, because of power limitations, the functionality of such devices is typically limited.

Typically, field devices are used to sense or control process variables in an industrial process. However, in some installations, it may be desirable to monitor the local environment of the field device.

SUMMARY

An industrial process monitor for monitoring an industrial process includes a controller configured to control operation of the industrial process monitor. An ambient environment sensor is configured to sense an ambient environment of the industrial process proximate the device and responsively provide a sensor output signal. Output circuitry is configured to provide an output based upon the sensor output signal. The controller causes the ambient environment sensor to enter a high power mode upon detection of an anomaly and/or probable anomaly in the sensor output signal.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Many high value monitoring applications which use monitoring techniques such as video, infrared, ultrasonic and audio require systems that can acquire information at high sampling rates and/or high resolutions. For example, a low resolution infrared monitoring system may be capable of monitoring an overall thermal profile. However, in order to specifically identify a location of a thermal anomaly high resolution is required. The capture and analysis of high resolution infrared images is needed to fully characterize the anomaly and to distinguish it from background noise or from expected thermal changes in the environment. However, the acquisition and processing of such high resolution images requires significant power. This quickly depletes the batteries of a self-powered field device such as a wireless field device. A similar problem exists with other techniques for monitoring an ambient environment, or example, audio and ultrasonic monitoring. In order to correctly characterize an acoustic event, high sampling rates are needed in order to analyze the spectral content so that a signal profile can be compared to a known acoustic signature, for example one which occurs when a system leaks.

The present invention offers techniques for addressing the above problem. A system is provided for monitoring the ambient environment which utilizes both a low power mode that is capable of acquiring data at low resolutions and/or sampling rates, and a high power mode that is only activated when the low power (pilot) mode detects a signal of potential interest. The present invention provides a technique for monitoring the ambient environment of an industrial process and relates to monitoring systems implemented in locally or internally powered wireless field devices. A wireless industrial process monitor is implemented in a field device and is configured to monitor an ambient environment in the industrial process. The monitoring may be through any appropriate ambient environment sensor including video, infrared, acoustic, or other. Such a sensor requires a high sampling frequency and/or high resolution in order to characterize and locate events of interest in the local (ambient) environment and to distinguish sensed signals related to these events from background noise. However, as high resolution and/or high sampling frequencies require an increased amount of power, a configuration is used in which a low energy "pilot mode" is implemented for normal operation. In this "pilot mode", a low resolution initial measurement is obtained. If an anomaly is detected based upon this low resolution initial measurement, a high resolution, high power mode may be entered by the system. In the high power mode, data is collected at a high data rate and/or resolution. Subsequently, the device may re-enter the "pilot mode" for continued low power operation.

Figure 1:
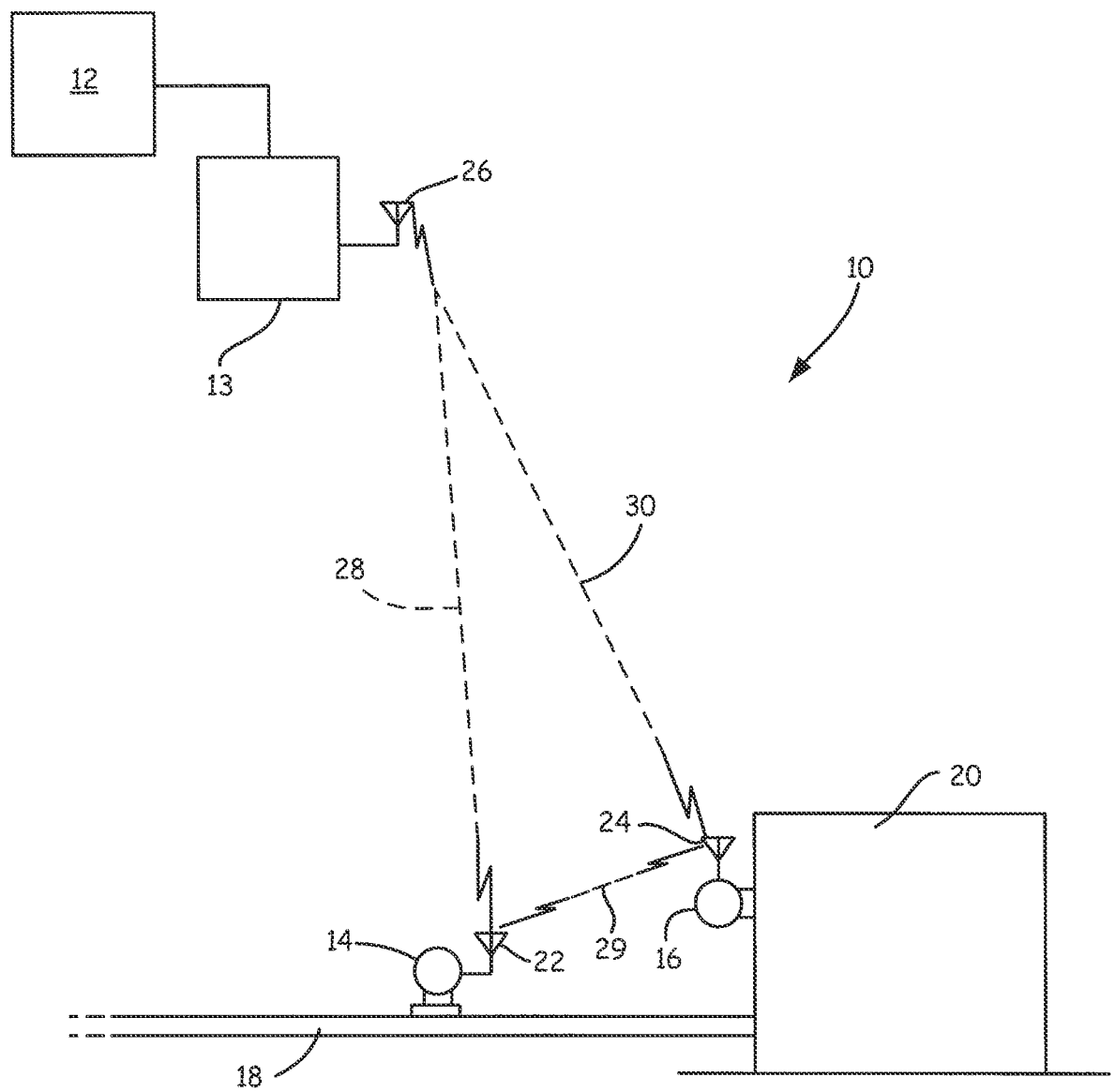
FIG. 1 is a simplified block diagram showing a process control or monitoring system for use with the present invention.

FIG. 1 is a simplified diagram showing an example process control or monitoring system 10 which includes a control room 12 communicating with field devices 14 and 16 through a wireless gateway 13. Communication between gateway 13 and control room 12 may be over a wired or wireless communication link. Field device 14 is shown coupled to process piping 18 and field device 16 is shown coupled to storage tank 20. However, devices 14, 16 may be located at any desired location. Devices 14 and 16 include antennas 22 and 24, respectively, for transmitting and/or receiving information from antenna 26 associated with wireless gateway 13. Devices 14 and 16 communicate using wireless radio frequency (RF) communication links 28, 29 and 30 with each other and with a remote location such as gateway 13. One example wireless communication protocol is the WirelessHART® protocol in accordance with IEC 62591. Field devices 14 and 16 include components to provide local (internal) power to the devices without requiring additional wires. For example, device 14 and 16 can include solar cells and/or batteries for local power.

As field device 14 and 16 operate using limited power, their processing abilities and the amount of data which they are capable of transmitting is limited. In one aspect, the present invention includes a wireless field device such as device 14 and 16, which includes the ability to monitor the ambient environment using an ambient environment sensor. Wireless field devices which are capable of operating at remote locations that do not require an external power source are available from, for example, Rosemount Inc. of Chanhassen, Minn. Such devices are configured to measure process variables or obtain other process information and transmit information using wireless communication techniques such as the WirelessHART® protocol.

Figure 2:
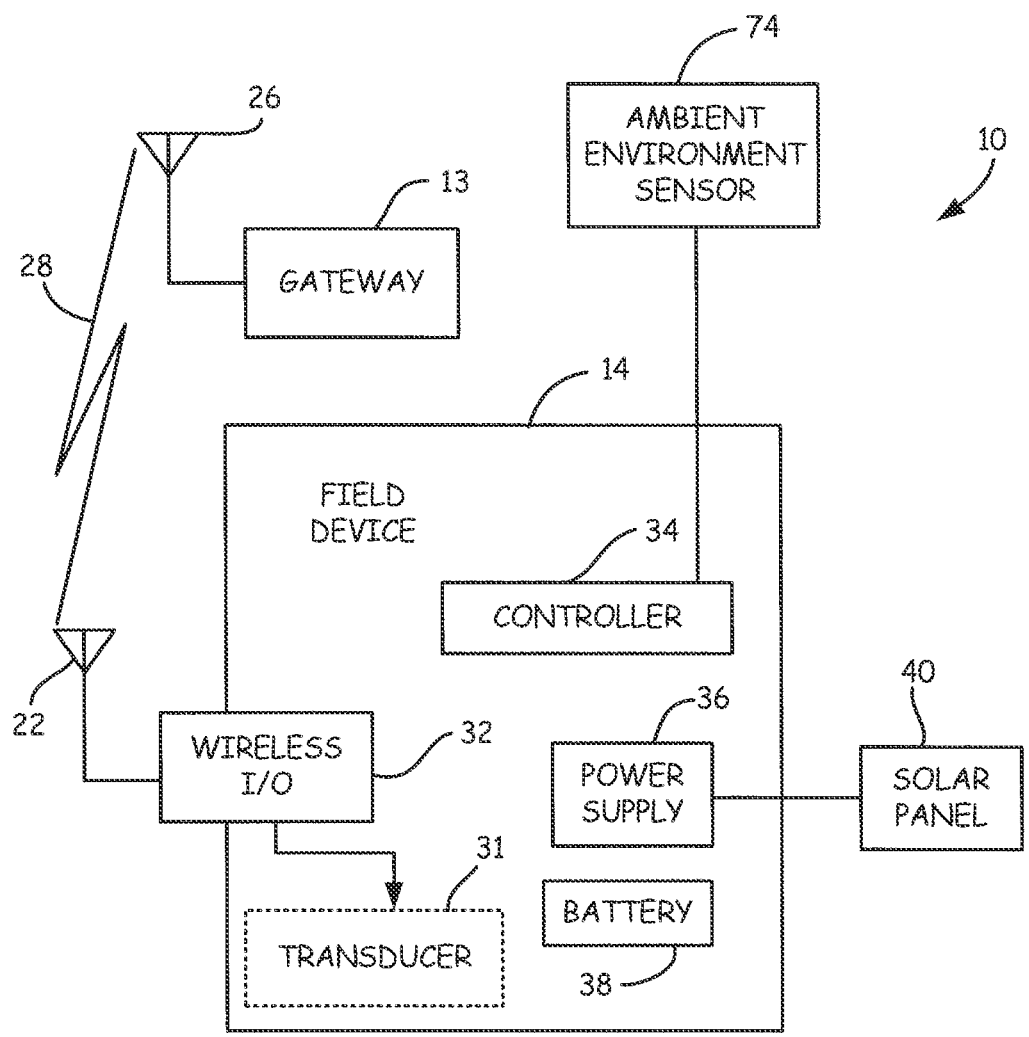
FIG. 2 is a block diagram showing components in a field device of one embodiment of the present invention.

FIG. 2 is a simplified block diagram showing field device 14 shown in FIG. 1 in greater detail. According to this embodiment, field device 14 includes an optional transducer 31, wireless input/output (communication) circuitry 32, controller 34, power supply circuit 36, battery 38 and solar panel 40. The transducer 31 can be either a sensor used to sense a process variable or a control element, such as a valve, which is used to control a process variable. The wireless communication circuitry 32 couples to antenna 22 for communication with gateway 13 over its antenna 26. Optionally, device 14 communicates directly with control room 12. Power supply circuit 36 is used to provide power to circuitry within field device 14. The power supply circuitry 36 can operate using internal power received from solar cell 40 and/or power received from battery 38. The power supply circuitry 36 can be powered from any type of internal power source that does not require wiring to a remote power source. The power supply circuitry 36 can be self-contained within the field device 14 or, in some embodiments, be located externally to the field device and positioned proximate to the field device. For example, a solar powered unit can be used to power a transmitter or other field device over a two wire connection which is also used to carry information. In such a configuration, the power supply circuitry can also provide wireless communication to a remote location. If sufficient power is received from solar cell 40, power supply circuitry 36 can also be used to charge the battery 38. An ambient environment sensor 74 is used to monitor the environment of device 14 as explained below in more detail.

Figure 3:
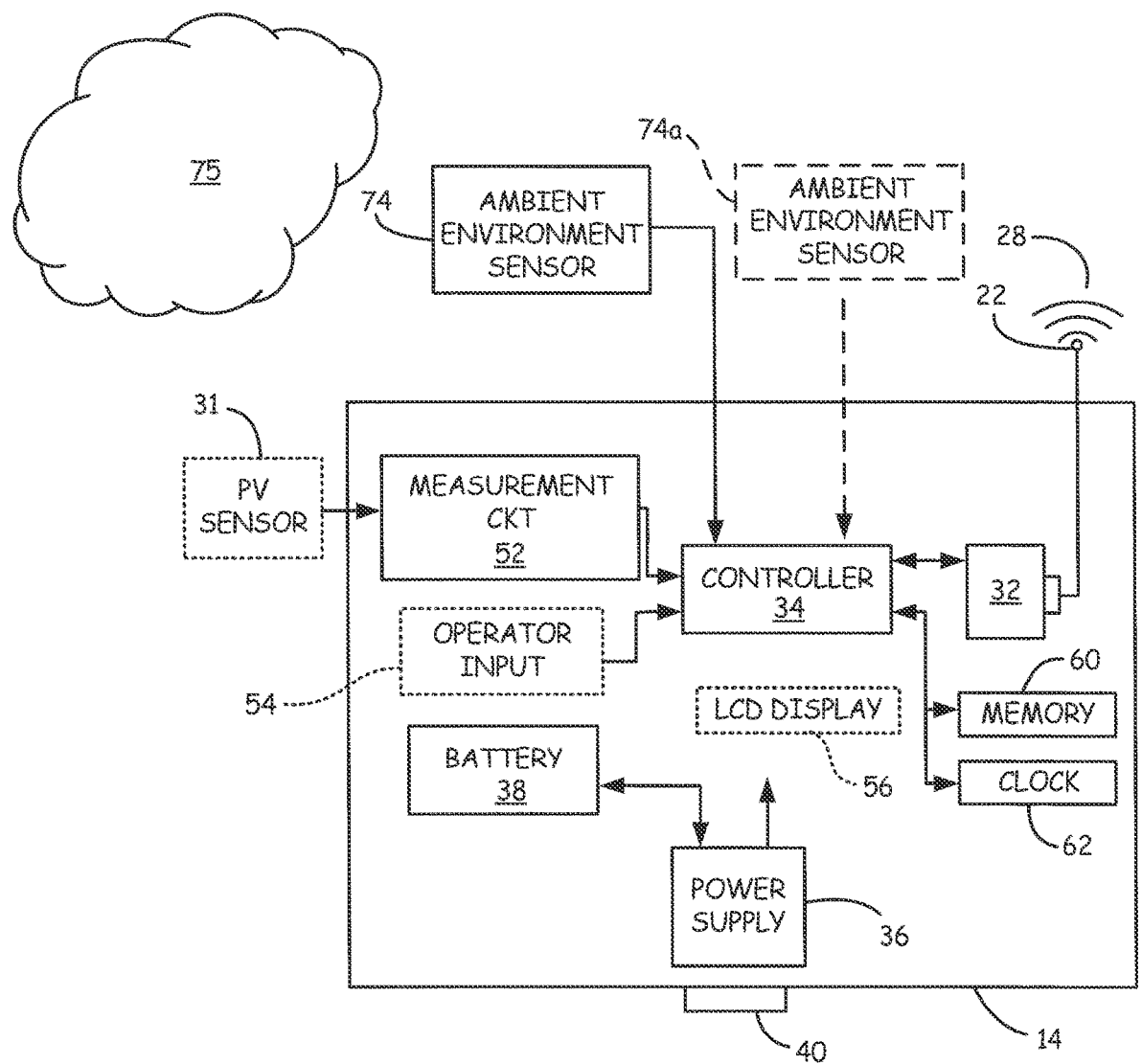
FIG. 3 is a more detailed block diagram showing components of the field device of FIG. 2.

FIG. 3 is a more detailed block diagram of process field device 14 according to an embodiment of the present invention and shows optional transducer 31 configured as a process variable sensor which can be used to measure a process variable such as pressure, temperature, etc. The process variable sensor 31 may be positioned within the housing of device 14 or external to the housing as illustrated in FIG. 3. Measurement circuitry 52 couples to process variable sensor 31 and is used to perform initial signal processing prior to providing a measurement signal to controller 34. An optional user input 54 is shown in FIG. 3. Similarly, an optional local output device such as LCD display 56 is shown.

Controller 34 is typically a microprocessor based controller and couples to a memory 60 and a clock 62. The clock 62 determines the operation speed of digital circuitry within field device 14 and memory 60 is used to store information. Memory 60 can comprise both permanent and volatile memory and can be used to store data used during processing, programming instructions, calibration information, or other information, data or instructions for use with process device 14. Memory 60 also stores information from sensor 74 as described herein.

FIG. 3 also illustrates ambient environment sensor 74 in accordance with one example embodiment. Ambient environment sensor 74 operates as discussed below in more detail and is configured to sense some aspect of an ambient environment 75 of the field device 14. For example, ambient environment sensor 74 may comprise an image capture device. In such a configuration, sensor 74 is configured to capture images from the ambient environment 75. Similarly, ambient environment sensor may comprise an acoustic or ultrasonic sensor configured to capture acoustic or ultrasonic signals from environment 75. In another example, sensor 74 is a thermal detector configured to capture a thermal image such as an infrared (IR) image, from environment 75. In one configuration, an optional high resolution sensor 74A is provided. In such a configuration, sensor 74A can be used to capture high resolution images or sample the environment at a higher data rate than sensor 74.

Figure 4:
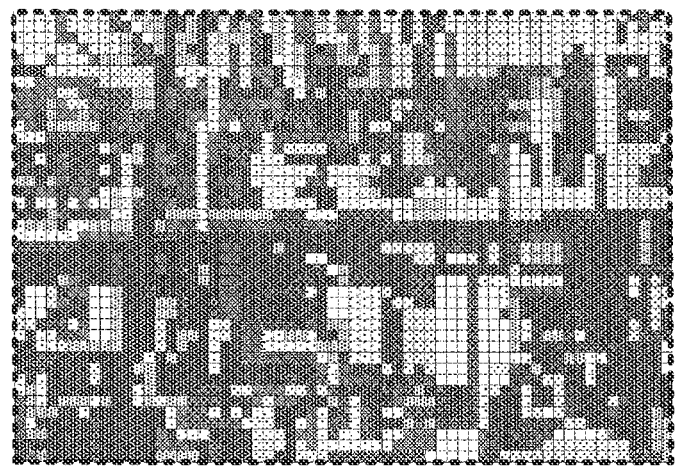
FIG. 4 shows a captured image of an industrial process during low power, low resolution "pilot mode" operation.
Figure 5:
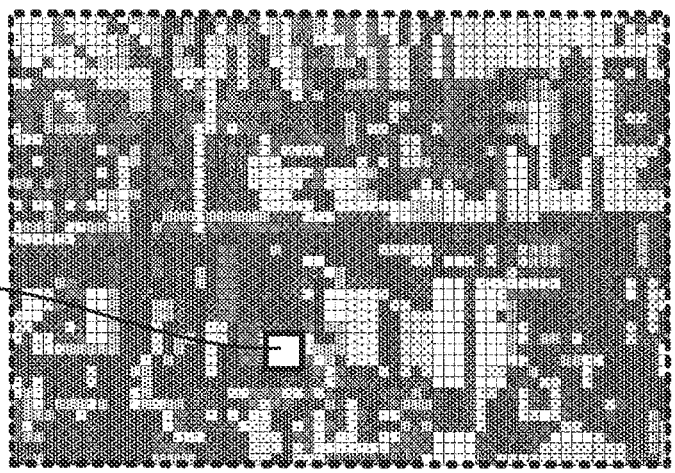
FIG. 5 is an image collected of the industrial process in a low power, low resolution pilot mode of operation showing an anomaly in the image.
Figure 6:
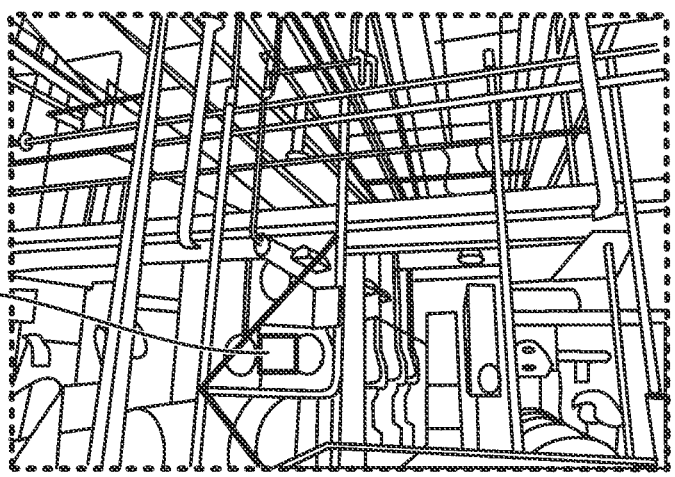
FIG. 6 is an image captured of industrial process in a high power, high resolution mode of operation.

As discussed above, the device 14 operates in a "pilot mode" obtaining low resolution/data rate information from sensor 74 during normal operation. A wide area of environment 75 can be monitored by sensor 74. For example, if sensor 74 is an infrared sensor, sensor 74 can comprise a low power infrared camera which is energized periodically to capture low resolution images such as that shown in FIG. 4. Controller 34 analyzes the low resolution images captured by sensor 74 to determine if there are thermal anomalies present that warrant capture of additional high resolution images and analysis. This determination can be through any appropriate technique, for example, a simple pixel comparison of the captured image to a reference image stored in the memory 60 of device 14. This reference image can be captured during commissioning of the device, or based upon an input received through circuitry 32 or local input 54. In another example, the reference image is transmitted to the device 14 using wireless communication or the like. The system may contain several reference images in memory 60 which all depict normal thermal profiles for the specific field of view of the sensor 74. If the acquired image is found to match one of the "normal" images, or found through some other low energy analysis technique to have no thermal anomalies present, the system may enter into a stand-by mode until the next scheduled low resolution image is captured. However, if the controller 34 determines that the low resolution capture contains a probable thermal anomaly such as illustrated in FIG. 5, the system may enter a high resolution mode. In one configuration, in the high resolution mode, the sensor 74 enters a high resolution capture mode. In another example embodiment, a second, high resolution sensor 74A is used to capture high resolution images. In this mode, field device 14 collects one or more high resolution images of the particular field of view of environment 75 such as illustrated in FIG. 6. These images can then be further analyzed in order to provide additional characterization of the anomaly including, for example, the location of the anomaly and temperature. Further, the high resolution image may be transmitted to a remote location such as control room 12 for further analysis and may be viewed by an operator.

Figure 7:
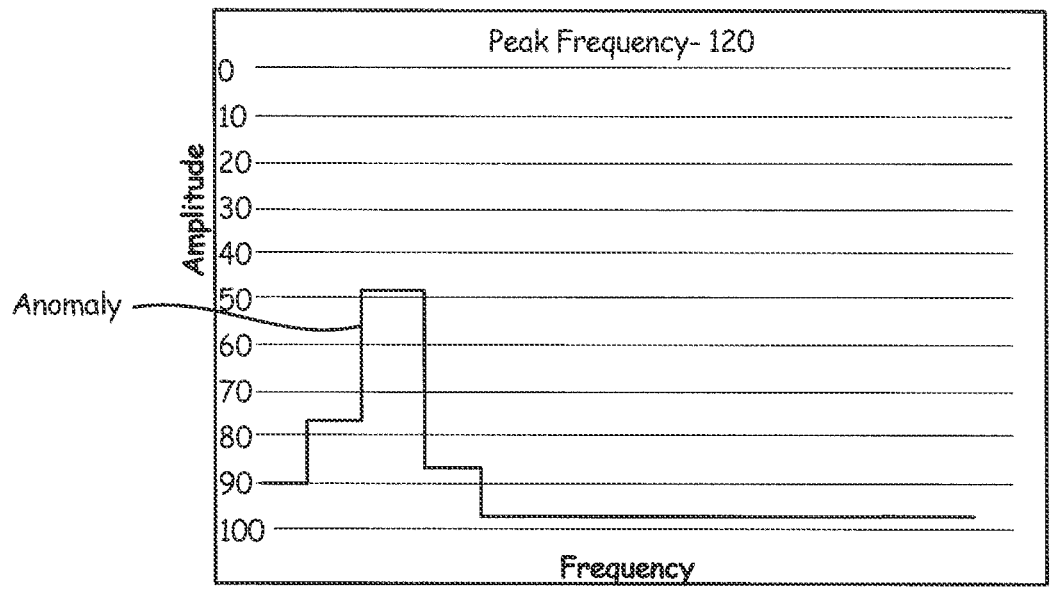
FIG. 7 is a graph showing the frequency domain of a captured acoustic signal during a low power, low spectral resolution pilot mode of operation.
Figure 8:
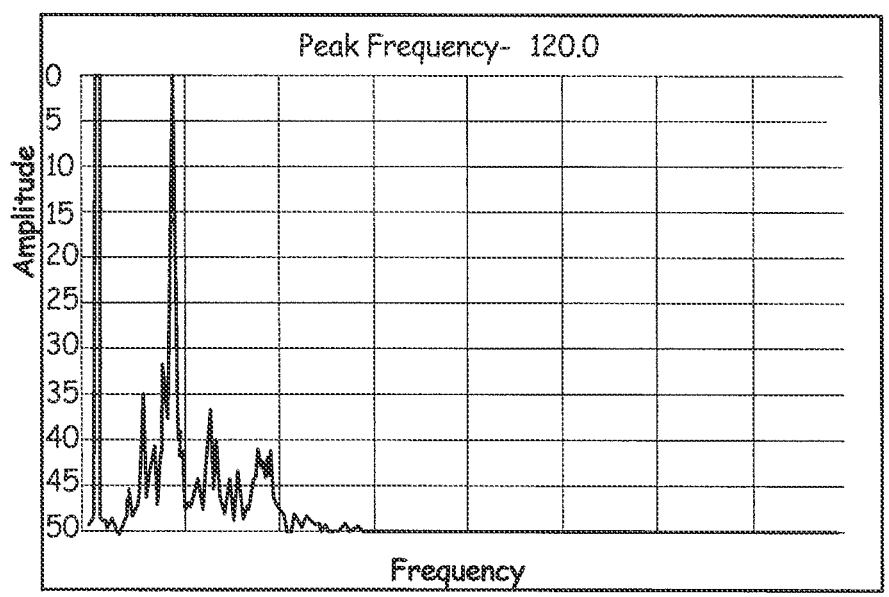
FIG. 8 is a graph of the frequency domain of captured acoustic data during a high power, high spectral resolution mode of operation.

A similar technique can be used for an acoustic monitoring system. For example, a low power pilot mode can be used to acquire acoustic data from the environment 75 at a low sample rate using sensor 74. The low sample rate data can be quickly analyzed in any appropriate way, including comparison of the low sample rate data to known normal acoustic profiles of the area stored in the memory 60 of device 14. FIG. 7 is a graph of such low sampling data. This low spectral resolution acoustic data shows an anomaly as illustrated in FIG. 7. When an anomaly is detected during the pilot mode, the controller 34 causes the system to enter a high sampling rate mode to acquire a high hand width acoustic profile of the environment such as illustrated in FIG. 8. This data may be acquired using the same sensor 74, or may be acquired using a different sensor 74A configured for high data rate acquisition. After the high data rate data is obtained, the profile can be characterized. For example, the profile can be scaled and compared to known acoustic events such as leaks, bearing wear, fires, etc.

Figure 9:
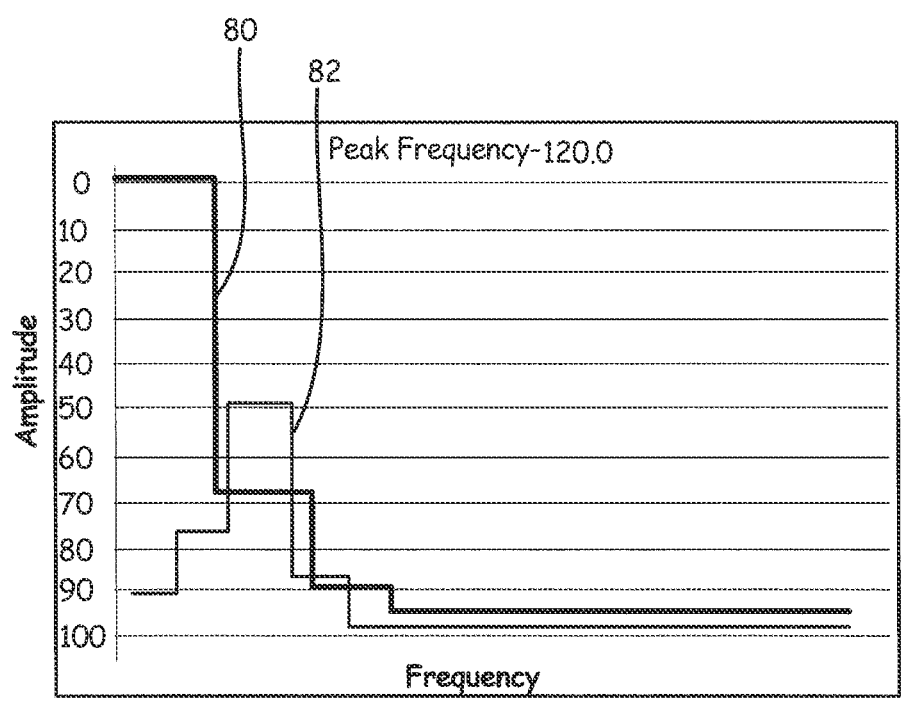
FIG. 9 is a graph of amplitude versus frequency illustrating a boundary fence.

FIG. 9 is a graph illustrating one technique for detecting an anomaly in an acoustic signal. FIG. 9 is a graph of amplitude versus frequency. Graph 80 illustrates a historical background or boundary "fence" of sensed acoustic signals. This fence is one example of a stored profile. This may be programmed through a learning technique, or by an operator setting particular frequencies and thresholds. FIG. 9 also illustrates a received acoustic signal 82 which violates the acoustic fence 80. This indicates that an anomaly has occurred in the received acoustic signal and can trigger a high resolution capture mode. Similar techniques can be used for RF or other sensing technologies.

In addition to obtaining high resolution data or data at a higher sample rate, the field device 14 can operate at a high clock speed, for example, by adjusting clock 62. This allows controller 34 to operate at a higher speed to analyze the collected data. In one aspect, the system is configured to transmit information, for example, wirelessly using communication link 28, which indicates that the power available from battery 38 is insufficient for continued operation. For example, although the system is capable of continued "pilot mode" operation, the stored energy may be insufficient for the device to enter a high power mode for any significant period of time. When in this condition, the system may automatically transition into an alternate operating mode. Instead of entering a high spectral resolution mode when triggered, the system will omit this step and simply alert the user via the wireless network that an uncharacterized anomaly has been detected.

An anomaly may be detected using an appropriate technique. As discussed above, the collected data can be compared to known normal profiles. Other techniques include comparison of the collected data to thresholds in the time or frequency domain, monitoring for rapid changes or spikes in the collected data, monitoring for sudden drop outs in the collected data. The analysis may be done in the time or frequency domain, or some combination thereof. As used herein, the term "ambient environment sensor" refers to a sensor which is configured to sense an aspect of the ambient environment of the device 14. These may be image sensors including visible and infrared radiation, as well as acoustic sensors including both audible and ultrasonic acoustic sensors. In one configuration, the ambient environment sensor senses more than just a single data point, for example, such as a single data point provided by a temperature sensor. The particular sensor may be configured to operate in two modes of operation, a low power "pilot mode" for acquiring low resolution and/or low data rate information, as well as a high power mode for acquiring high resolution and/or high data rate information. In another configuration, a second ambient environment sensor is provided for high resolution/data rate data collection. In another example configuration, one or more devices 14 are provided for monitoring an environment in the "pilot mode." Data collected during the "pilot mode" monitoring is transmitted to another location, for example, over communication link 28. This information may be received at a location which has a larger power source or is coupled to line power. The data can be used to trigger a high power mode in which high data rate/high resolution data collection from a sensor at the remote location. In another example configuration, the anomaly may be detected in one device 14, and a second device, such as device 16 shown in FIG. 1, used to collect the high data rate/high resolution information. Similarly, if the sensor 74 is directional, when entering a high data acquisition state, the sensor may be aimed or "zoomed" into the area in which the anomaly was detected. Similarly, the sensor 74 may be configured to scan an area either in the "pilot mode" as well as in the high data rate mode.

Although the present invention has been described with reference to preferred embodiments, workers skilled in the art will recognize that changes may be made in form and detail without departing from the spirit and scope of the invention. As used herein, the ambient environment sensors preferably are configured to provide an output having a profile. The profile may be a plurality of pixels such as those which are used to an image, a plurality of amplitude or magnitude values such as from the sampled output of an acoustic sensor, or can be spectral content such as from an acoustic or image sensor. In the high power mode, the clock 62 can operate at a higher frequency such that controller 34 operates a faster processing rate. As used herein, the term "anomaly" includes an actual anomaly, an impending anomaly as well as a probably anomaly. A probable anomaly includes an anomaly which is more likely than not to have occurred. However, the threshold for what constitutes "probable" can be selected as desired.

What is claimed is:

1. A wireless industrial process monitor for monitoring an industrial process, comprising:
    a controller configured to control operation of the industrial process monitor;
    an ambient environment sensor configured to sense acoustic signals received from an ambient environment of the industrial process proximate the process monitor and responsively provide a sensor output signal, wherein the ambient environment sensor is an acoustic sensor configured to operate in a low power pilot mode at a first sampling rate and in a high power mode at a second sampling rate, wherein the first sampling rate is less than the second sampling rate;

a memory configured to store acoustic profile information comprising acoustic amplitude values at a plurality of frequencies;

wireless output circuitry configured to provide an output based upon the sensor output signal; and wherein the controller causes the ambient environment sensor to enter a high power mode upon detection of an anomaly in the sensor output signal based upon a comparison of acoustic amplitude values at a plurality of frequencies in the sensor output with the acoustic amplitude values at the plurality of frequencies of the acoustic profile information stored in the memory.

2. The wireless industrial process monitor of claim 1 including a clock and wherein the clock is configured to provide a higher clock rate during the high power mode.

3. The wireless industrial process monitor of claim 1 including an internal power source configured to power the wireless industrial process monitor.

4. The wireless industrial process monitor of claim 1 wherein the controller is configured to detect an anomaly based upon a spike in a portion of a profile of the sensor output signal.

5. The wireless industrial process monitor of claim 1 wherein the controller is configured to detect an anomaly based upon a change in the sensor output signal.

6. The wireless industrial process monitor of claim 1 wherein the ambient environment sensor comprises a first ambient environment sensor configured to sense the ambient environment during the low power pilot mode of operation and a second ambient environment sensor configured to sense the environment during the high power mode.

7. A wireless monitoring system including the wireless industrial process monitor of claim 1 and a remote device having a second ambient environment sensor.

8. The wireless industrial process monitor of claim 1 wherein the acoustic sensor comprises an ultrasonic sensor.

9. The wireless industrial process monitor of claim 1 wherein the controller is configured to detect an anomaly based upon a time domain profile of the sensor output signal.

10. The wireless industrial process monitor of claim 1 wherein the controller is configured to detect an anomaly based upon a frequency domain profile of the sensor output signal.

11. The wireless industrial monitor of claim 1 wherein the detection of an anomaly is based upon a historical background of sensed acoustic signals.

12. The wireless industrial monitor of claim 1 wherein the detection of an anomaly is based upon a boundary of sensed acoustic signals.

13. The wireless industrial monitor of claim 1 wherein the detection of an anomaly is a learned reference.

14. The wireless industrial monitor of claim 1 wherein the detection of an anomaly is a programmed reference.

15. A method in a wireless field device in an industrial process control system for monitoring an industrial process, comprising:

storing acoustic profile information comprising acoustic amplitude values at a plurality of frequencies in a memory;

sensing an ambient environment of the industrial process using an ambient environment sensor comprising an acoustic sensor which senses an acoustic signal received from the ambient environment operating in a low power pilot mode at a first sampling rate;

comparing acoustic amplitude values at a plurality of frequencies of an output from the ambient environment sensor to the acoustic amplitude values at the plurality of frequencies of the acoustic profile information stored in the memory;

detecting an anomaly in the sensor output signal based upon the comparing; and causing the sensor to enter a high power mode in response to detection of the anomaly at a second sampling rate, wherein the first sampling rate is less than the second sampling rate.

16. The method of claim 15 wherein the comparing is performed in the frequency domain.

17. The method of claim 15 wherein the comparing is performed in the time domain.

18. The method of claim 15 including outputting an alert if there is insufficient power available to enter the high power mode.

19. The method of claim 15 wherein the comparing is further based upon a historical background of sensed acoustic signals.

20. The method of claim 15 wherein the comparing is further based upon a boundary of sensed acoustic signals.

21. The method of claim 15 wherein the reference is a learned reference.

22. The method of claim 15 wherein the reference is a programmed reference.

* * * * *